(12) United States Patent
Addis

(10) Patent No.: US 6,910,857 B2
(45) Date of Patent: Jun. 28, 2005

(54) SEAL

(75) Inventor: Mark E. Addis, Kennebunk, ME (US)

(73) Assignee: United Technologies Corporation, Hartford, CT (US)

( * ) Notice: Subject to any disclaimer, the term of this patent is extended or adjusted under 35 U.S.C. 154(b) by 202 days.

(21) Appl. No.: 10/330,751

(22) Filed: Dec. 26, 2002

(65) Prior Publication Data

US 2004/0126226 A1 Jul. 1, 2004

(51) Int. Cl.[7] .................................................. F01D 11/00
(52) U.S. Cl. .................... 415/174.2; 415/230; 415/231; 277/410
(58) Field of Search ............................. 415/113, 174.2, 415/174.1, 174.5, 230, 231; 277/355, 501, 410

(56) References Cited

U.S. PATENT DOCUMENTS 2,883,212 A * 4/1959 Laser .......................... 277/419
5,201,530 A    4/1993 Kelch et al.
5,351,971 A   10/1994 Short
5,599,026 A    2/1997 Sanders et al.
RE36,270 E     8/1999 Duggan
6,168,162 B1   1/2001 Reluzco et al.
6,220,602 B1 * 4/2001 Webster et al. ............. 277/410
6,318,728 B1  11/2001 Addis et al.
6,390,476 B1 * 5/2002 Tong et al. ................. 277/355
6,746,019 B1 * 6/2004 Liebenberg et al. ........ 277/410
2002/0001519 A1 * 1/2002 Webster ....................... 415/10

* cited by examiner

Primary Examiner—Edward K. Look
Assistant Examiner—Richard A. Edgar
(74) Attorney, Agent, or Firm—Bachman & LaPointe, P.C.

(57) ABSTRACT

A seal apparatus provides the seal between inner and outer elements. The seal apparatus has a flexible sealing element for forming a seal with a first of the inner and outer elements. At least one support element is secured to the sealing element. The seal further includes means for magnetically interacting with the first element to bias the seal relative to the first element.

11 Claims, 3 Drawing Sheets

SEAL

BACKGROUND OF THE INVENTION (1) Field of the Invention

This invention relates to shaft seals, and more particularly to turbine engine shaft seals (2) Description of the Related Art In turbomachinery applications, it is often necessary to provide a seal between a rotating shaft and a housing element. At the seal, the shaft typically has symmetry around a central axis (e.g., the shaft has a cylindrical surface area). The shaft axis is normally coincident with the axis of rotation and with an axis of the housing in which the seal is mounted. However, vibration may induce small local oscillatory excursions of the axis of rotation. Brush and labyrinth seals may have sufficient compliance or clearance in their respective bristle packs and labyrinth teeth to accommodate relatively minor excursions. To accommodate greater excursions, there may be a non rigid mounting of the seal element to the housing. This mounting permits excursions of the shaft axis to radially shift the seal relative to the housing to avoid damage to the seal.

BRIEF SUMMARY OF THE INVENTION

A seal apparatus provides the seal between inner and outer elements. The seal apparatus has a flexible sealing element for forming a seal with a first of the inner and outer elements. At least one support element is secured to the sealing element. The seal further includes means for magnetically interacting with the first element to bias the seal relative to the first element.

Such an apparatus may be used in a turbine engine. The engine includes a rotor shaft carried by a support structure. The support structure carries a seal assembly circumscribing the shaft and having a flexible sealing element conforming a seal with the shaft. The rotor carries a rotor magnetic element and the seal carries a seal magnetic element positioned to interact with the rotor magnetic element to bias the seal assembly toward a coaxial relation with the shaft.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
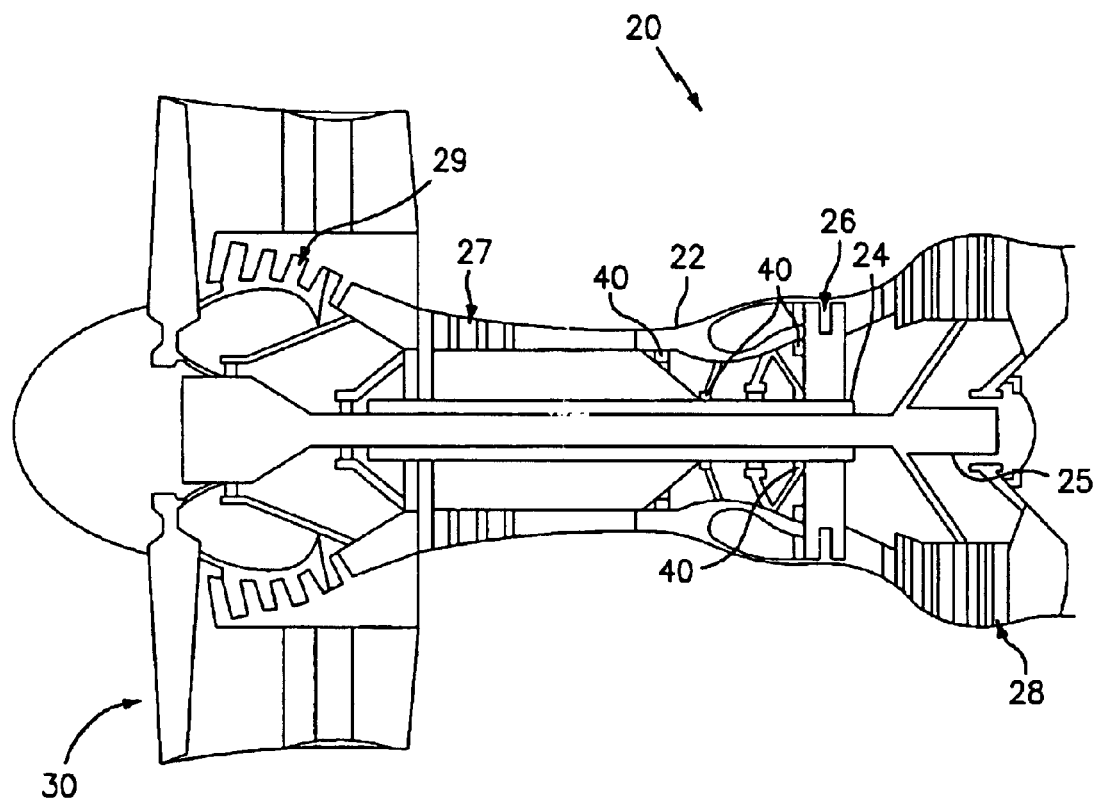
FIG. 1 is a semi-schematic longitudinal sectional view of a turbine engine.

FIG. 1 shows a turbine engine 20 having a housing case 22 containing concentric high and low pressure rotor shafts 24 and 25. The shafts are mounted within the case for rotation about an axis 500 which is normally coincident with central longitudinal axes of the housing and shafts. The high pressure rotor shaft 24 is driven by the blades of a high pressure turbine section 26 to in turn drive the blades of a high pressure compressor 27. The low pressure rotor shaft 25 is driven by the blades of a low pressure turbine section 28 to in turn drive the blades of a low pressure compressor section 29 and a fan 30.

The rotor shafts are supported relative to the case by a number of bearing systems. The rotor shafts may be sealed relative to the case by sealing systems 40 which may include brush sealing elements, labyrinth sealing elements, or the like.

Figure 2:
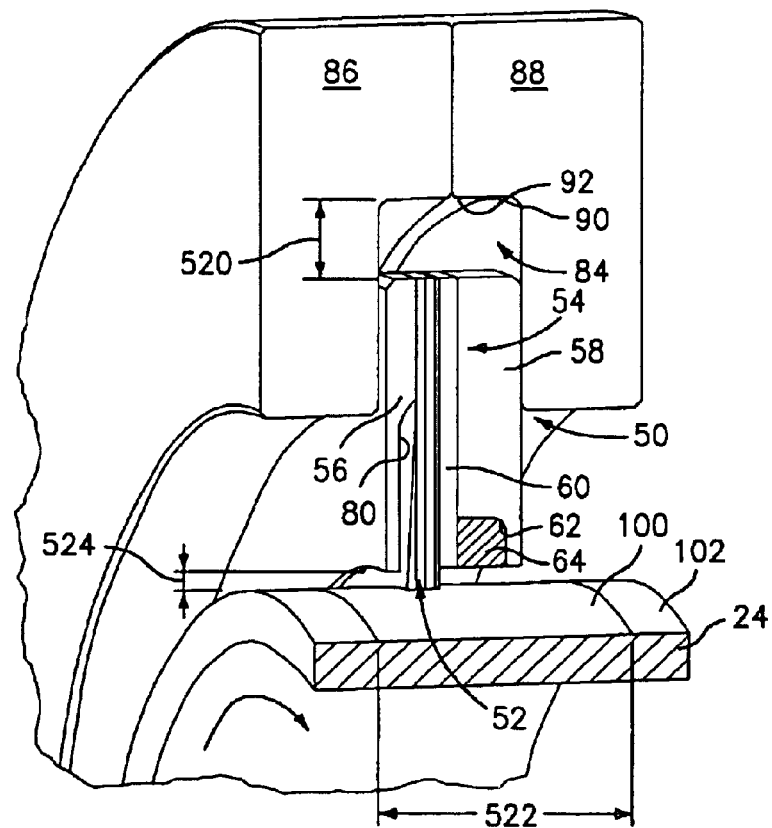
FIG. 2 is a partial semi-schematic longitudinal sectional view of a seal system of the engine of FIG. 1.

FIG. 2 shows further details of the exemplary sealing system 40. The system includes a brush seal 50 having a bristle pack 52 secured in a seal body 54. The seal body comprises a high pressure side backing plate 56 and a low pressure side backing element formed by the combination of a backing plate 58 and a shield 60. In an exemplary embodiment, the bristle pack 52, backing plate 56, backing plate 58, and shield 60 are of generally annular configuration. Extending downstream from its upstream face along its inboard side, the backing element 58 has an annular inwardly and upstream open compartment 62 containing a magnetic element 64. An exemplary element is formed approximately as a square-section annulus of a permanent magnet. An exemplary permanent magnet is an aluminum-nickel-cobalt (alnico) magnet. The shield 60 is secured along the upstream faces of the backing plate 58 and magnetic element 64. The bristle pack lies along the upstream face of the shield 60 and at its outboard end is secured between the upstream face of the shield and the downstream face of the backing plate 56. An exemplary securing is by welding (e.g., TIG or electron beam). Extending upstream from its downstream face, the backing plate 56 has an annular pocket 80 along an inboard portion. The pocket 80 accommodates the bristles during flexing of the bristles. The seal 50 is captured within an inwardly-open annular pocket or channel 84 formed by annular shoulders in a pair of mated upstream and downstream housing elements 86 and 88. In a normal running condition, there is a headspace or clearance having a radial span 520 between the seal periphery 90 and the base 92 of the pocket 84.

Figures 3, 4:
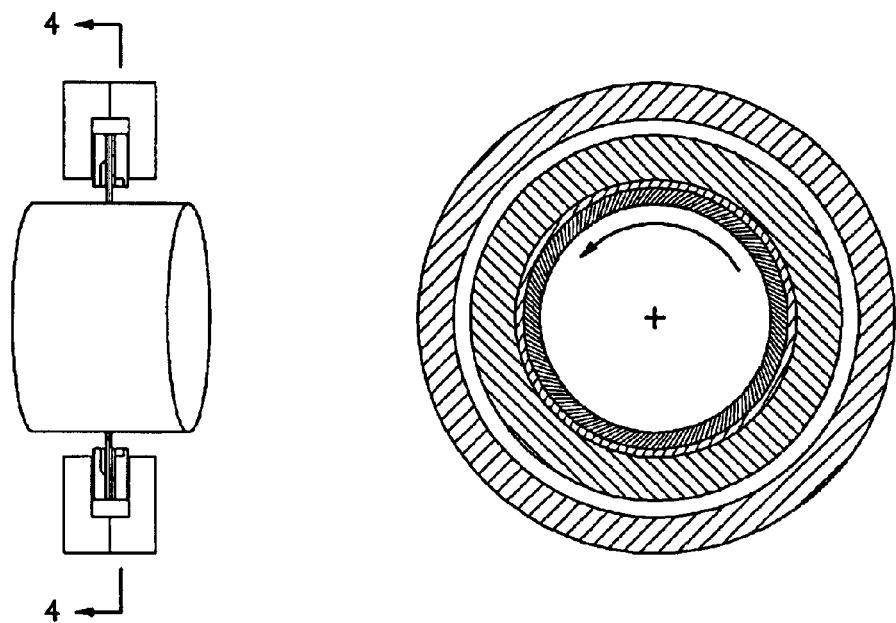
FIG. 3 is a semi-schematic longitudinal sectional view of the seal system of the engine of FIG. 1.
FIG. 4 is a semi-schematic transverse sectional view of the seal system of FIG. 3, taken along line 4—4.

FIG. 2 further shows the shaft 24 as having its own magnetic element in the exemplary form of a magnetic coating 100. The coating is applied over a portion of the exterior surface 102 of a metallic component of the shaft. The coating has a longitudinal span 522. The span is advantageously positioned to extend at least partially immediately inboard of the magnetic element 64, more preferably fully beneath such element and, in the illustrated embodiment, more broadly under the entire seal 50. For wear resistance, the magnetic coating may be comprised of magnetic particles in a wear-resistant matrix or may itself be covered by an additional wear-resistant layer. In normal true-running operation, the bristle tips contact the shaft. There is clearance between the inboard surfaces of the rigid components 56, 58, 60 and 64 of the seal. For purposes of illustration, in the exemplary embodiment this is shown as a single clearance of radial span 524, although the different components may well have different clearances. FIGS. 3 and 4 show the shaft running in a true condition.

Figure 5:
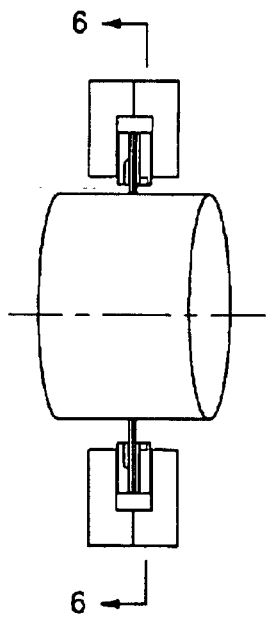
FIG. 5 is a semi-schematic longitudinal sectional view of the seal system of the engine of FIG. 1 in an initial excursion stage.
Figure 6:
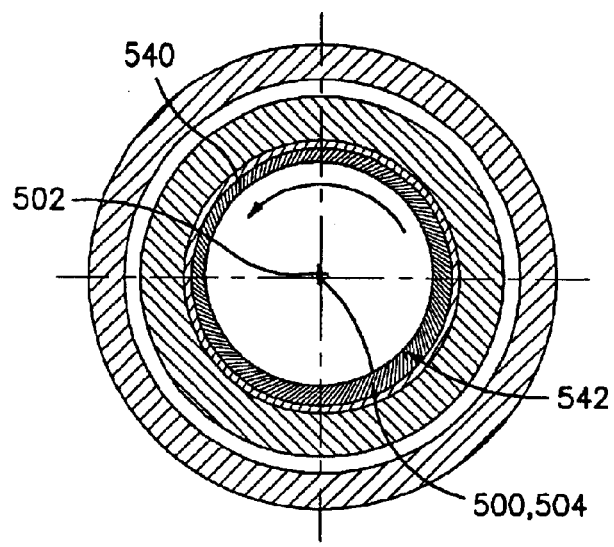
FIG. 6 is a semi-schematic transverse sectional view of the seal system of FIG. 5, taken along line 6—6.
Figure 7:
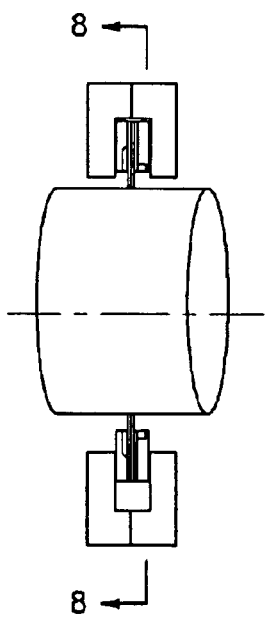
FIG. 7 is a semi-schematic longitudinal sectional view of the seal system of the engine of FIG. 1 in a second excursion stage.
Figure 8:
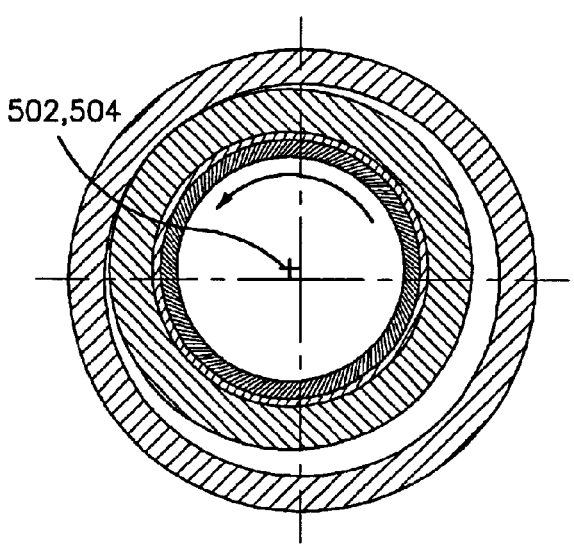
FIG. 8 is a semi-schematic transverse sectional view of the seal system of FIG. 7, taken along line 8—8.

FIGS. 5 and 6 show an initial excursion of the shaft axis 502 relative to the housing axis 500. The rotor excursion brings the outer surface magnetic coating 100 toward the inboard surface of the magnetic element 64 near one diametric location 540 and away therefrom near an opposite diametric location 542. When this occurs, increased magnetic repulsion between the coating 100 and element 64 near the location 540 and reduced repulsion near the location 542 will tend to push the seal to move its axis toward the displaced shaft axis 502. Thus the seal will be shifted within the channel 84 to at least partially realign the seal axis 504 with the shaft axis 502 (FIGS. 7 and 8). If the shaft axis 502 returns to align with the axis 500, a similar magnetic interaction will tend to bring the seal axis back into alignment with both such axes.

One or more embodiments of the present invention have been described. Nevertheless, it will be understood that various modifications may be made without departing from the spirit and scope of the invention. For example, the magnetic coating on the shaft may be replaced by a separately-formed magnetic element. Exemplary elements could include a permanent magnet (e.g., an alnico sleeve on the shaft or a circumferential array of permanent magnet inserts in compartments in the shaft). Similarly, the magnetic element of the seal body could be replaced by a coating or by an array of permanent magnets. Additional features are possible such as a seal anti-rotation features (e.g., radial pins or tabs mounted to the seal and riding in slots in the case). Accordingly, other embodiments are within the scope of the following claims.

What is claimed is:

1. An annular brush seal for providing a seal between inner and outer elements comprising:
    a bristle pack having first and second sides and an inboard tip portion for forming a seal with the inner element and an outboard root portion;
    at least one support element on at least one of the first and second sides secured to the bristle pack and rigid relative to the bristle pack; and
    at least one seal magnetic element comprising an alnico magnet positioned to magnetically interact with the inner element.

2. An annular brush seal for providing a seal between inner and outer elements comprising:
    a bristle pack having first and second sides and an inboard tip portion for forming a seal with the inner element and an outboard root portion;
    at least one support element on at least one of the first and second sides secured to the bristle pack and rigid relative to the bristle pack; and
    at least one seal magnetic element positioned to magnetically interact with the inner element so as to be biased by the inner element.

3. The seal of claim 2 being segmented.

4. A turbine engine comprising:
    a support structure having a first axis;
    a rotor shaft carried by the support structure and having:
    a rotor axis; and
    at least one rotor magnetic element;
    a seal assembly carried by the support structure circumscribing the shaft and having:
    a seal axis;
    a flexible sealing element for sealing with the shaft; and
    at least one seal magnetic element positioned to magnetically interact with said at least one rotor magnetic element to bias the seal assembly toward a coaxial relation with the shaft.

5. The engine of claim 4 wherein the at least one rotor magnetic element comprises a magnetic coating.

6. The engine of claim 5 wherein at least one seal magnetic element comprises a segmented annular permanent magnet.

7. The engine of claim 4 wherein the flexible sealing element comprises a bristle pack and the seal assembly further comprises:
    a first support plate on a high pressure side of the bristle pack;
    a second support plate on a low pressure side of the bristle pack and carrying the at least one seal magnetic element; and
    a shield plate between the second support plate and the bristle pack.

8. The engine of claim 4 wherein the seal assembly is carried in an annular compartment in the support structure in a radially floating condition.

9. A seal for providing a seal between inner and outer elements comprising:
    a flexible sealing element for forming a seal with a first of the inner and outer elements;
    at least one support element secured to the sealing element; and
    means for magnetically interacting with the first element to bias the seal relative to the first element the means carried by the at least one support element.

10. The seal of claim 9 wherein the sealing element comprises a bristle pack having first and second sides and a first portion for sealing with the inner element and a second portion secured to the at least one support element.

11. The seal of claim 10 wherein the at least one support element comprises at least first and second plates at the first and second sides of the bristle pack.

* * * * *